US009454383B2

(12) United States Patent
Cai et al.

(10) Patent No.: US 9,454,383 B2
(45) Date of Patent: Sep. 27, 2016

(54) AUTOWIRING LOCATION AGNOSTIC SERVICES INTO APPLICATION SOFTWARE

(71) Applicant: International Business Machines Corporation, Armonk, NY (US)

(72) Inventors: JunJie Cai, Cary, NC (US); Rohit D. Kelapure, Morrisville, NC (US); James W. Stopyro, Rochester, MN (US); Matthew J. Sykes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/266,147

(22) Filed: Apr. 30, 2014

(65) Prior Publication Data

US 2015/0317146 A1 Nov. 5, 2015

(51) Int. Cl.
*G06F 9/44* (2006.01)
*G06F 9/445* (2006.01)
*G06F 9/50* (2006.01)
*G06F 9/54* (2006.01)
*H04L 29/08* (2006.01)
*H04W 4/02* (2009.01)

(52) U.S. Cl.
CPC ............ *G06F 9/445* (2013.01); *G06F 8/65* (2013.01); *G06F 8/76* (2013.01); *G06F 9/5072* (2013.01); *G06F 9/547* (2013.01); *H04L 67/10* (2013.01); *H04W 4/02* (2013.01); *G06F 8/60* (2013.01); *G06F 2209/463* (2013.01); *G06F 2209/542* (2013.01)

(58) Field of Classification Search
USPC ........................................................ 717/172
See application file for complete search history.

(56) References Cited

U.S. PATENT DOCUMENTS

| | | | | |
|---|---|---|---|---|
| 7,596,620 | B1* | 9/2009 | Colton | G06F 8/10 709/201 |
| 7,668,929 | B1* | 2/2010 | Ruhlen | G06F 17/30855 707/769 |
| 7,685,604 | B2* | 3/2010 | Baartman | G06F 8/51 717/106 |
| 7,739,407 | B1* | 6/2010 | Pakkala | G06F 17/30905 709/246 |
| 8,572,602 | B1* | 10/2013 | Colton et al. | 717/177 |
| 8,615,731 | B2* | 12/2013 | Doshi | 717/106 |
| 8,627,426 | B2 | 1/2014 | Lucovsky et al. | |
| 9,058,571 | B2* | 6/2015 | Guizar | G06Q 10/06 |
| 2003/0158953 | A1* | 8/2003 | Lal | 709/230 |
| 2004/0203891 | A1* | 10/2004 | Cole et al. | 455/456.1 |
| 2006/0129605 | A1* | 6/2006 | Doshi | 707/104.1 |
| 2008/0154951 | A1* | 6/2008 | Martinez et al. | 707/103 Y |
| 2013/0007280 | A1* | 1/2013 | Aslam et al. | 709/226 |
| 2013/0152070 | A1* | 6/2013 | Bhullar et al. | 717/173 |

(Continued)

OTHER PUBLICATIONS

List of IBM Patents or Patent Applications Treated as Related; (Appendix P), Filed Oct. 14, 2015; 2 pages.
JunJie Cai, et al., "Autowiring Location Agnostic Services Into Application Software", U.S. Appl. No. 14/636,709, filed Mar. 3, 2015.

(Continued)

*Primary Examiner* — Marina Lee
(74) *Attorney, Agent, or Firm* — Cantor Colburn LLP; Nick Bowman

(57) ABSTRACT

A system and method that performs retrofitting and autowiring of service bindings by generating a plurality of retrofitted references from a plurality of resource references and autowiring the plurality of retrofitted references into an application. The system and method deploys the application to an environment in response to the autowiring of the plurality of retrofitted references.

9 Claims, 6 Drawing Sheets

(56) References Cited

U.S. PATENT DOCUMENTS

| | | | |
|---|---|---|---|
| 2013/0238689 A1* | 9/2013 | Matsushima et al. | 709/203 |
| 2015/0089338 A1* | 3/2015 | Kuo | 715/205 |
| 2015/0317146 A1* | 11/2015 | Cai | G06F 8/65 717/172 |
| 2015/0317149 A1* | 11/2015 | Cai | G06F 8/65 717/172 |

OTHER PUBLICATIONS

Deploy Java, Groovy, or Scala Apps; retrieved on Feb. 10, 2014; retrieved from the Internet http://docs.cloudfoundry.com/frameworks/java/spring/spring.html/.

Using Cloud Foundry Services with Spring: Part 2—Auto-reconfiguration; retrieved on Feb. 10, 2014; retrieved from the internet http://blog.springsource.org/2011/04/using-cloud-foundry-services-with-spring-part-2-auto-reconfiguration/.

* cited by examiner

AUTOWIRING LOCATION AGNOSTIC SERVICES INTO APPLICATION SOFTWARE

BACKGROUND

The disclosure relates generally to autowiring services to application software, and more specifically, to autowiring location agnostic services to web applications.

In general, an information technology system incorporates service technologies that assist users of the system in performing tasks or activities. However, because service technologies come in a variety of forms and may be internal or external to the information technology system, the system becomes decentralized and difficult to manage. In addition, the decentralized information technology system is generally forced to choose between exclusive system frameworks. Thus, upon choosing a framework, the system has naturally regulated itself to only those service technologies that are compatible to the chosen framework.

For example, a web application, constructed from a first framework, may incorporate multiple service technologies, such as Platform as a Service, Software as a Service, Data as a Service, etc., where each technology must utilize a program language and/or a communication protocol that is compatible with the first framework. Yet, to add service technologies of a second framework that is different with the first framework (i.e., the second framework utilizes different program languages and/or communication protocols), the web application must be reconfigured and/or reprogramed to operate on the second framework. Reconfiguring and reprogramming increases the size and cost of the web application, while decreasing its operability. Further, when the program language and/or communication protocol of the second framework is completely incompatible with the first framework (i.e., reconfiguring and reprogramming of the web application is not possible), then the service technologies of the second framework cannot be incorporated into the web application.

SUMMARY

According to one embodiment of the present invention, a method performs retrofitting and autowiring of service bindings by generating a plurality of retrofitted references from a plurality of resource references and autowiring the plurality of retrofitted references into an application. The method deploys the application to an environment in response to the autowiring of the plurality of retrofitted references.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
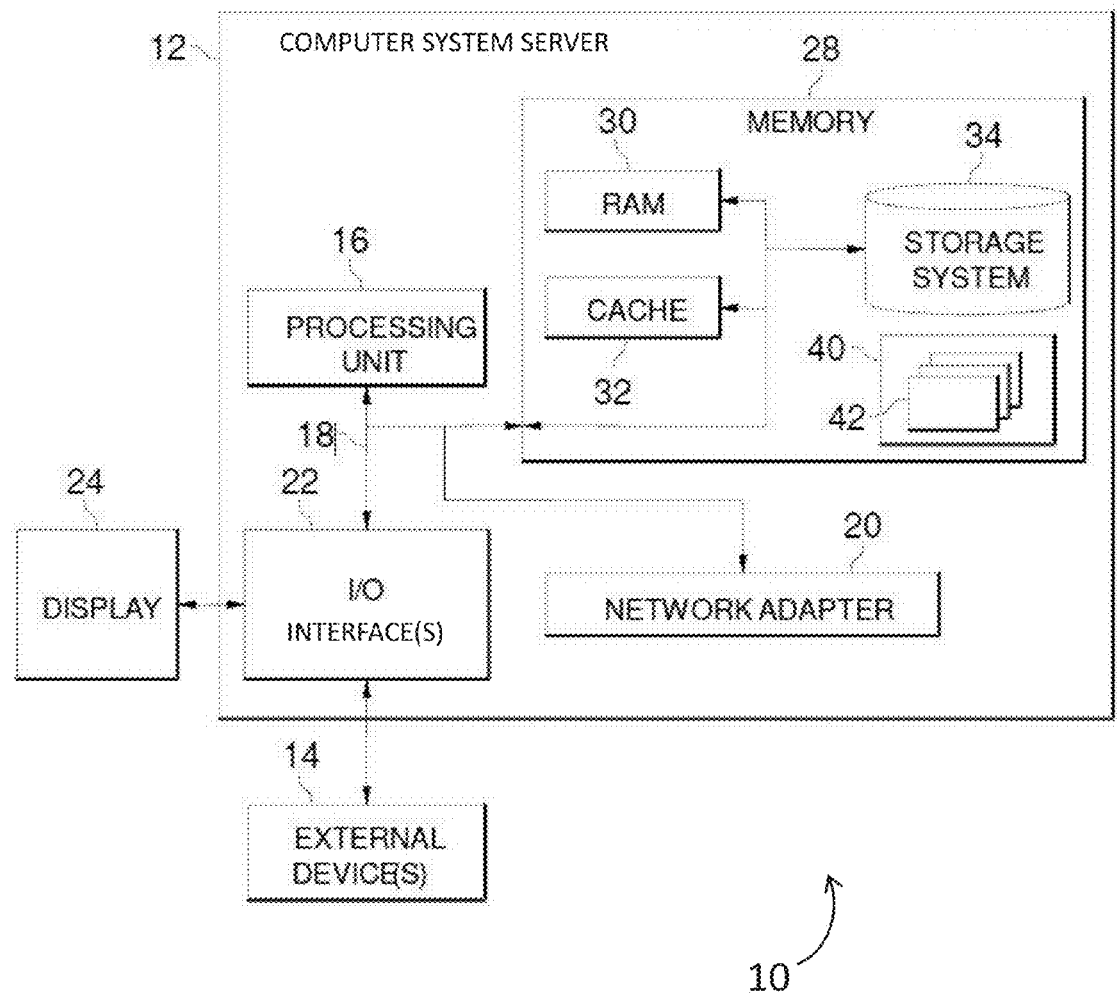
FIG. 1 illustrates a cloud computing node according to an embodiment of the present invention.

As indicated above, because information technology systems incorporate a variety of internal and external service technologies and must choose between exclusive system frameworks, these systems become robust decentralized systems that are difficult to manage and operate with access to only a set number of service technologies. Thus, what is needed is a uniform way of incorporating different service technologies that leverage multiple application frameworks by an information technology system without being restricted to incorporating or implementing the corresponding program language and/or communication protocol varieties that adversely affect that system.

In general, embodiments of the present invention disclosed herein may include an autowiring system, method, and/or computer program product that performs retrofitting and autowiring of the service bindings for service technologies to application software irrespective of system frameworks of the service technologies and the application software. A service binding is a mechanism that provides connection and credential information of a service technology to the application software. Retrofitting of a service binding is a process of configuring the connection and credential information to be compatible with the framework of the application software. Autowiring is an injection of the retrofitted service bindings into a code of the application software. Thus, the retrofitting and autowiring of the service bindings by the autowiring system, method, and/or computer program enables the incorporation of any variety of internal and external service technologies into the application software irrespective of frameworks, without an increase in application size, cost, and/or decrease in application operability.

Systems and/or computing devices (e.g., the autowiring system above; and cloud computing node 10 and computer system server 12 of FIG. 1, cloud computing environment 50 of FIG. 2, and system 400 and sub-system 402 of FIG. 4 below) may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, or handheld computer, or some other computing system and/or device (e.g., personal digital assistant (PDA) or cellular telephone 54A, desktop computer 54B, laptop computer 54C, and automobile computer system 54N of FIG. 2).

In general, computing devices further may include a processor (e.g., processing unit 16 of FIG. 1) and a computer readable storage medium (e.g., memory 28 of FIG. 1), where the processor receives computer readable program instructions, e.g., from the computer readable storage medium, and executes these instructions, thereby performing one or more processes, including one or more of the processes described herein (e.g., retrofitting and autowiring of the service bindings).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing device (e.g., a user's computer), partly on the computing device, as a stand-alone software package, partly on a local computing device and partly on a remote computer device or entirely on the remote computer device. In the latter scenario, the remote computer may be connected to the local computer through any type of network (as further described below), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network, a network of interconnected nodes, and/or a wireless network and comprise copper transmission cables, optical transmission fibers, wireless transmission, routers, firewalls, switches, gateway computers and/or edge servers.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, autowiring system and method and/or elements thereof may be implemented as computer readable program instructions on one or more computing devices (e.g., computer workstation, server, desktop, etc.), stored on computer readable storage medium associated therewith. A computer program product may comprise such computer readable program instructions stored on computer readable storage medium for carrying and/or causing a processor to carry out the of autowiring system and method.

The autowiring system and method and/or elements thereof may also be implemented in a cloud computing architecture; however, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources, such as networks, network bandwidth, servers, processing, memory, storage, applications, virtual machines, and services that can be rapidly provisioned and released with minimal management effort or interaction with a provider of the service (e.g., caching, data as a service, analytics, location awareness, social aggregation). This cloud model may include at least five characteristics (e.g., on-demand self-service, broad network access, resource pooling, rapid elasticity, and measured service), at least three service models (e.g., Software as a Service, Platform as a Service, and Infrastructure as a Service), and at least four deployment models (e.g., private cloud, community cloud, public cloud, and hybrid cloud).

On-demand self-service is an example of a cloud model characteristic where a cloud consumer can unilaterally provision computing capabilities, such as server time and network storage, as needed automatically without requiring human interaction with the service's provider. Broad network access is an example of a cloud model characteristic where capabilities are available over a network and accessed through mechanisms that promote use by heterogeneous thin or thick client platforms (e.g., computing systems as described above). Resource pooling is an example of a cloud model characteristic where the provider's computing resources are pooled to serve multiple consumers using a multi-tenant model, with different physical and virtual resources dynamically assigned and reassigned according to demand. Further, resource pooling provides a sense of location independence in that the consumer generally has no control or knowledge over the exact location of the provided resources but may be able to specify location at a higher level of abstraction (e.g., country, state, or datacenter). Rapid elasticity is an example of a cloud model characteristic where capabilities can be rapidly and elastically provisioned, in some cases automatically, to quickly scale out and rapidly released to quickly scale in. To the consumer, the rapid elasticity capabilities available for provisioning often appear to be unlimited and can be purchased in any quantity at any time. Measured service is an example of a cloud model characteristic where cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS) is an example of a service model where the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS) is an example of a service model where the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) is an example of a service model where the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud is a cloud infrastructure that is operated solely for an organization. Private cloud may be managed by the organization or a third party and may exist on-premises or off-premises. Community cloud is a cloud infrastructure that is shared by several organizations and supports a specific community that has shared concerns (e.g., mission, security requirements, policy, and compliance considerations). Community cloud may be managed by the organizations or a third party and may exist on-premises or off-premises. Public cloud is a cloud infrastructure that is made available to the general public or a large industry group and is owned by an organization selling cloud services. Hybrid cloud is a cloud infrastructure that is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or operability of embodiments of the invention described herein. Regardless, cloud computing node 10 is capable of being implemented and/or performing any of the operability set forth hereinabove.

In cloud computing node 10 there is a computer system/server 12, which is operational with numerous other general purpose or special purpose computing system environments or configurations. Examples of computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the operations of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the operations and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
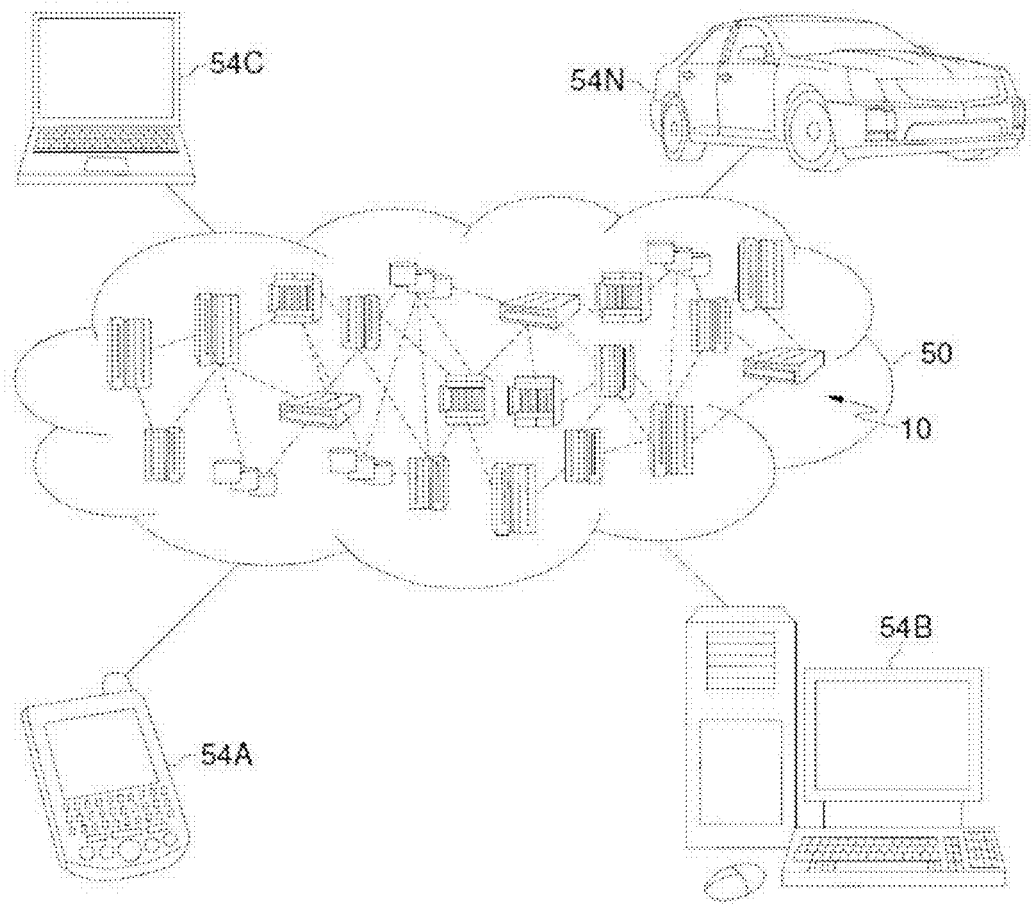
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer IaaS, PaaS, and/or SaaS for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computing system or computerized device over any type of network and/or network addressable connection (e.g., using a web browser).

Figure 3:
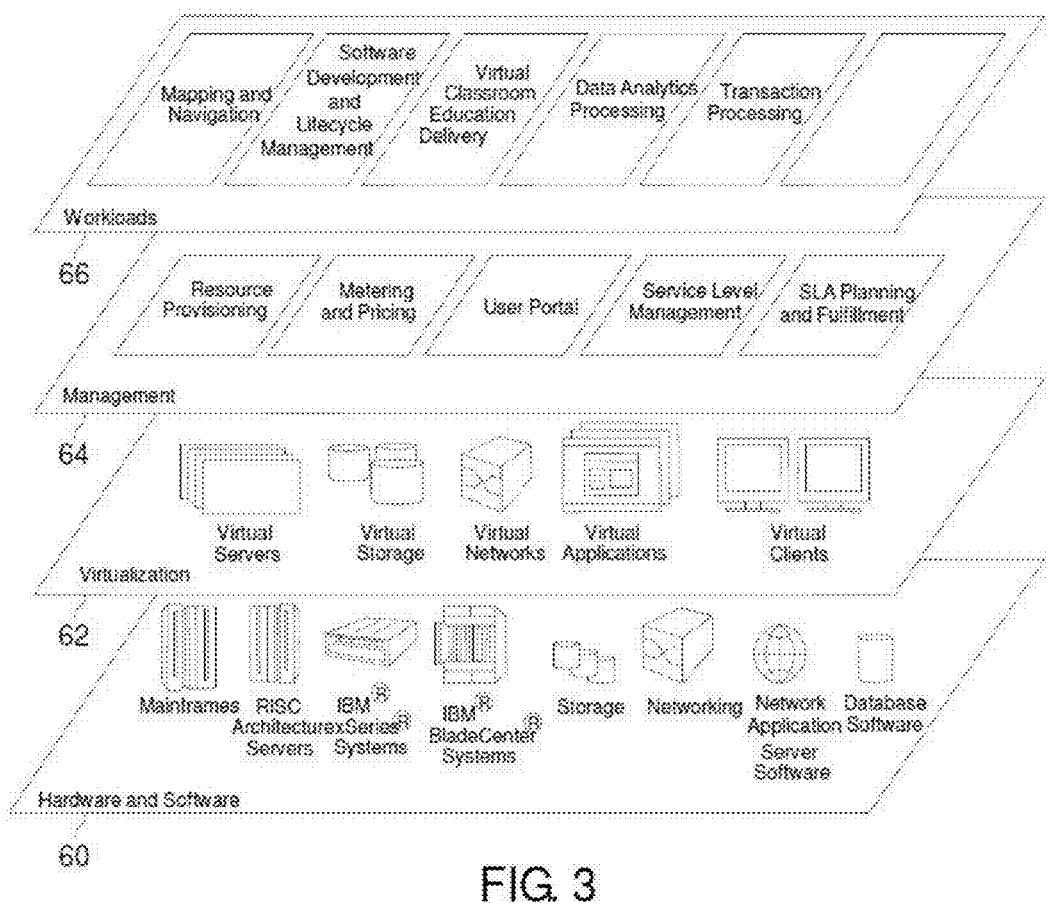
FIG. 3 illustrates abstraction model layers according to an embodiment of the present.

Referring now to FIG. 3, a set of operational abstraction layers provided by cloud computing environment 50 (FIG. 2) is shown. It should be understood in advance that the components, layers, and operations shown in FIG. 3 are intended to be illustrative only and embodiments of the invention are not limited thereto. FIG. 3 includes a hardware and software layer 60, a virtualization layer 62, a management layer 64, and workloads layer 66.

Hardware and software layer 60 includes hardware and software components. Examples of hardware components include mainframes, in one example IBM zSeries systems; RISC (Reduced Instruction Set Computer) architecture based servers, in one example IBM pSeries systems; IBM xSeries systems; IBM BladeCenter systems; storage devices; networks and networking components. Examples of software components include network application server software, in one example IBM WebSphere application server software; and database software, in one example IBM DB2 database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities (e.g., containers) may be provided: virtual servers; virtual storage; virtual networks, including virtual private networks; virtual applications and operating systems; and virtual clients. In one example, management layer 64 may provide the operations described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of operability for which the cloud computing environment may be utilized. Examples of workloads and operations which may be provided from this layer include: mapping and navigation; software development and lifecycle management; virtual classroom education delivery; data analytics processing; transaction processing; and mobile desktop.

Figure 4:
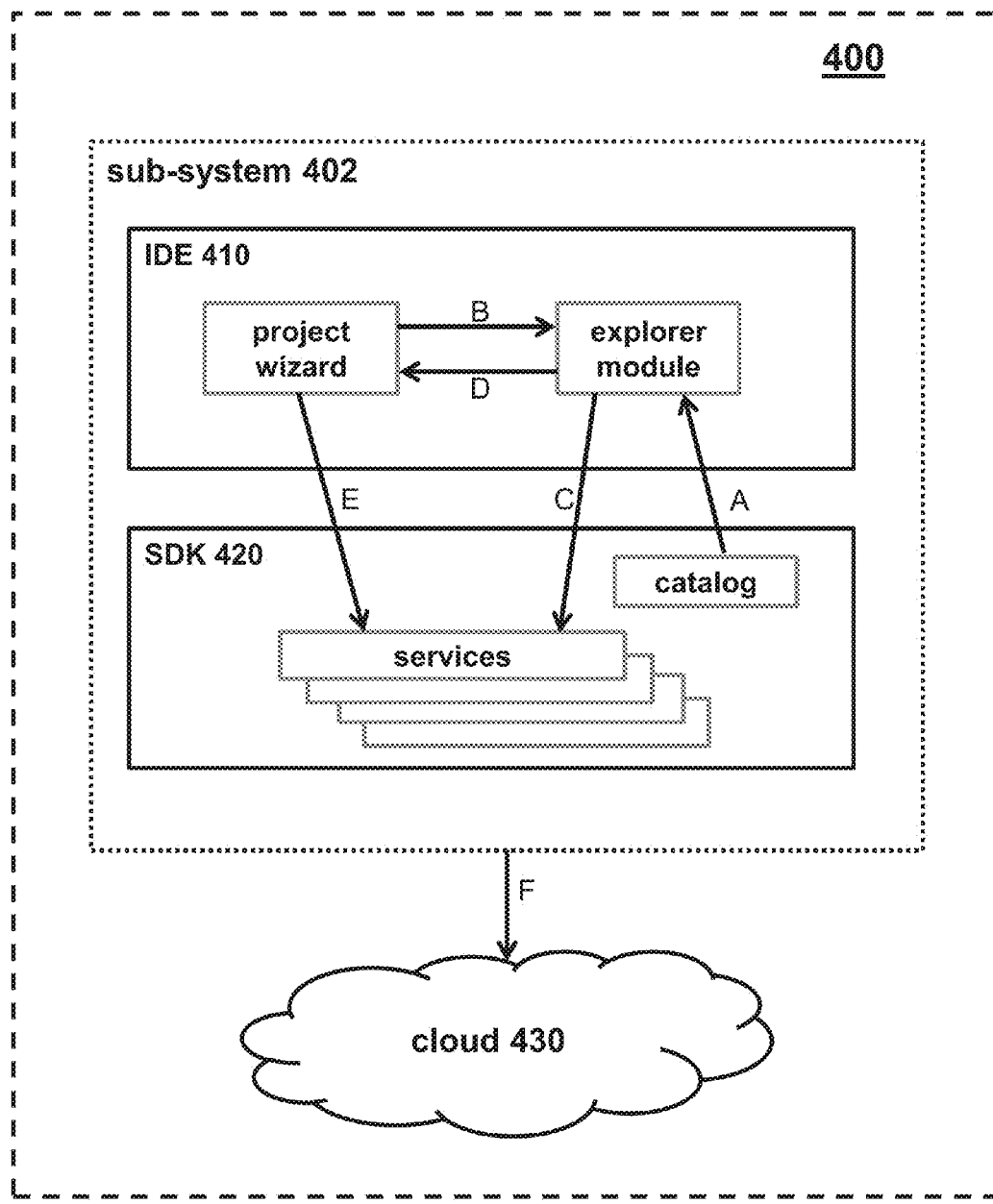
FIG. 4 illustrates an exemplary autowiring system.

FIG. 4 illustrates an exemplary autowiring system 400, where within a sub-system 402 an integrated development environment (IDE) 410 and a software development kit (SDK) 420 communicate to retrofit and automatically wire service bindings of any variety of service technologies of the SDK 420 to application software that may be utilized in an external environment, such as a cloud 430. The application software generated via the system 400 may be any application, presently created or previously existing, for providing services to a user as further described below, and may herein be referred to as 'the APP.' The autowiring of retrofitted service bindings by the autowiring system 400 enables the APP to have location transparency, which is the ability to locally operate and/or operate in cloud environment, with a code of the APP unchanged.

For example, the APP may be application software, such as a web application, executed by a container, such as a web server. The web server may execute a specific framework, such as Java EE, and thus the web application is built on the same framework. By utilizing the autowiring system 400, any variety of service technologies, regardless of their compatibility with the specific framework of the web server, may be bound to the web application. For instance, the sub-system 402 retrofits the connection and credential information of any service technology to match the specific framework of the web server and injects that retrofitted information via an autowiring process into the web application. Thus, any service technology, incompatible or otherwise, may become location agnostic service that is interoperable with the web application (e.g., the service technologies are not required to be local to the web server and are not restrained to certain frameworks). The web application may then provide a plurality of location agnostic services locally or in a cloud environment, i.e. wherever the web application is exposed, without making any changes to a code of the web application.

The autowiring system 400, therefore, performs the retrofitting and autowiring dynamically at runtime (e.g., during service binding and/or creation of the APP)—instead of post processing of connection and credential information as is done in the decentralized information technology system described above; utilizes the specific framework of the container—rather than relying on proprietary metadata as is done in the decentralized systems; enables multiple service bindings of services from non-compatible systems to the container—instead of being restricted to service technologies of the same framework as is done in the decentralized systems; and intercepts the container resource lookup and injection mechanisms to automatically wire resource references (e.g., connection and credential information) of the web application to cloud based resources (as further described below).

The system 400 and elements therein may take many different forms and include multiple and/or alternate components and facilities. While an exemplary system 400 is shown in FIG. 4, the exemplary components illustrated in FIG. 4 are not intended to be limiting. Indeed, additional or alternative components and/or implementations may be used. For example, while single items are illustrated for the IDE 410 and the SDK 420 (and other items) by FIG. 4, these items may represent a plurality of environments and kits that generate and/or update application software via retrofitting and autowiring.

The sub-system 402 and elements therein are an example of the program/utility 40, having a set (at least one) of program modules 42 of FIG. 1. The sub-system 402 may include a computing device with a processor and a memory configured to perform retrofitting and autowiring of the service bindings. For instance, the sub-system 402 overloads a first framework via the IDE 410 by retrofitting connection and credential information for any service technology of the SDK 420 and by then putting the retrofitted information in a container related to the first framework. The APP may thus use the same framework to access the service technology via the retrofitted information without doing any extra coding, processing, or the like.

In operation, the sub-system 402 utilizes an explorer module of the IDE 410 to receive or access (arrow A) a catalog of the SDK 420 that details service technologies (e.g., a set of services) available for autowiring to the APP. The IDE 410 utilizes the catalog to lookup (arrow B) by a program wizard a desired service from the set of services. The service lookup includes accessing the connection and credential information and retrofitting the information for the APP. In response to the service lookup, IDE 410 utilizes the explorer module to create (arrow C) the service in the SDK 420, where the service awaits further processing in the SDK 420 by the sub-system 402. Service lookup and creation may repeat until all desired services are identified for further processing by the sub-system 402.

Next, the IDE 410 imports (arrow D) each desired service from the explorer module into the program wizard and executes embedded runtimes to test and/or debug D each desired service in the SDK 420. The executing of the embedded runtimes effectively automatically wires the retrofitted service bindings of each desired service to the APP. Once the desired services are automatically wired to the APP within the sub-system 402, the APP may be deployed E to the cloud 430.

The sub-system 402 may include multiple SDKs, each SKD providing a different development platform that further provides different varieties of service technologies (e.g., a different set of services). The importing of each desired service and executing of embedded runtimes by the sub-system 402 provides a uniform way to automatically wire retrofitted service bindings of any service of any SDK regardless of whether that service is running locally on the sub-system 402 or in a cloud 430.

The integrated development environment (IDE) 410 may include computer readable instructions designed to perform and/or cause the sub-system 402 to provide facilities to programmers (e.g., user of the sub-system 402) for application software development (e.g., the IDE 410 may generally be included within any computing device, such as in a memory, employing a computer operating system such as one of those mentioned above, and accessed via a network in any one or more of a variety of manners). Examples of the IDE 410 may include Java EE, Microsoft Visual Studio, Oracle Netbeans, Eclipse, Liberty Basic, etc. The facilities of the IDE 410 may include a source code editor, build automation tools, a debugger, intelligent code completion features, a compiler, an interpreter, a class browser, an object browser, a class hierarchy diagram, etc. As illustrated, the IDE 410 includes the explorer module and the program wizard.

In general, an explorer module includes computer readable program instructions configured to access content, such as documents, media files, components of service models, service information (connection and credential information of a service technology), etc. The explorer module of the IDE 410 may include computer readable program instructions configured to communicate with the SDK 420 (and other elements of system 400). As illustrated, the explorer module is configured to receive or access the catalog (which details the set of services) for presentation to the IDE 410 and in turn a programmer. In response to a particular service being identified from the catalog by the IDE 410, the explorer module communicates with the SDK to create the identified service for the APP. Examples of the explorer module of the IDE 410 include Cloud Explorer, etc.

In general, a program wizard includes computer readable program instructions configured to utilize software development tools of the SDK 410 to develop or update application software (e.g., the APP). The program wizard of IDE 410 may include computer readable instructions to communicate with the SDK 410 to lookup and import services identified by the explorer module and execute embedded runtimes to test and/or debug the identified services of the SDK 420 with the APP. Examples of the program wizard of the IDE 410 include project wizard, project Explorer, etc.

The software development kit (SDK) 420 may include computer readable instructions designed to perform and/or cause the sub-system 402 to provide a set of software development tools (e.g., related to each service of the set of services) particular to a development platform of the SDK 420 (e.g., the SDK 420 may generally be included within a computing device, such as in a memory, employing a computer operating system such as one of those mentioned above, and accessed via a network in any one or more of a variety of manners). For example, the SDK 410 may provide a set of software development tools for a certain software package, software framework, hardware platform, computer system, video game console, operating system, or similar. As illustrated, the SDK 420 may include the catalog and the set of services.

In general, a catalog is list of metadata which defines objects in a database, such as data base tables, views, synonyms, value ranges, indexes, users, user groups, etc. The catalog of the SDK 420 includes a list of the set of services available for the particular development platform of the SDK 420, and may further include connection and credential information of each service of services available.

The cloud 430 may include a cloud model, as described above, capable of enabling convenient, on-demand network access to a shared pool of configurable resources.

Figure 5:
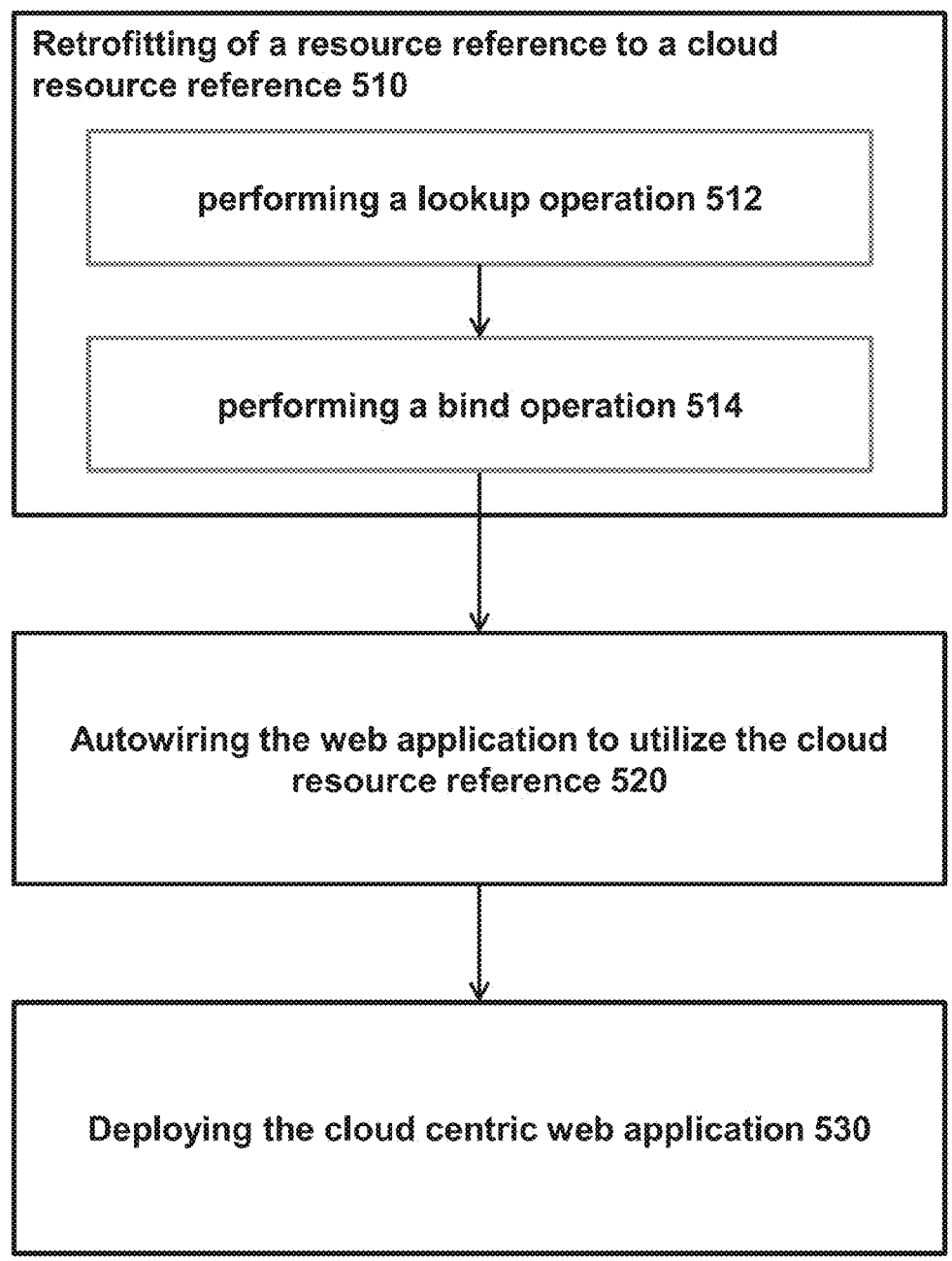
FIG. 5 illustrates an exemplary process flow of a retrofitting and autowiring of service bindings by an autowiring system.

The retrofitting and autowiring of service bindings by the autowiring system 400 will be described with reference to an exemplary process 500 of FIG. 5. Further, the above web application and container example are utilized to assist in illustrating the process 500; however, the process 500 is not intended to be limited to the web application and container.

The process 500 is a method for autowiring service technologies (e.g., location agnostic services) into the APP (e.g., cloud centric web applications) in a container (e.g., a web server). The process 500 begins in block 510 with the retrofitting of a plurality of resource references, each resource reference utilizing a programming model of the web server for a resource lookup, in preparation for converting each resource reference into a cloud based resource reference.

A resource reference is an object that points to a service, where the service is generally local to the container on which the web application operates. A programming model is style of programming the structure and elements of computer readable program instructions. Examples of a programming model include Java Extended Edition and the like. A cloud based resource reference is an object that points to a location agnostic service, where the location agnostic service is generally external to the container on which the web application operates. Examples of a cloud based resource reference include Java Database Connectivity, Database, Representational State Transfer, Uniform Resource Locator, etc.

Thus, as illustrated, in retrofitting a plurality of resource references the system 400 performs a lookup operation (sub-block 512) by utilizing a container resource lookup and injection mechanism (e.g., the sub-system 402 utilizes a catalog of the SDK 420 to retrieve connection and credential information or a resource reference that points to the service). For instance, if the container is utilizing Java Extended Edition as a programing model, then the container resource lookup and injection mechanism may include a Java Naming and Directory Interface. For example, the Java Naming and Directory Interface is utilized by the web application to lookup services:

```
Importjavax.sql.Datasource;
public class MyServlet extends HTTPServlet
{
    @Resource(name="jdbc/somedb")
    private DataSource myDatasource;
}
``` where the service is identified by '@Resource' and the resource reference is 'private DataSource myDatasource.' Another example includes:

```
Importjavax.sql.Datasource;
public class MyServlet extends HTTPServlet
{
    InitialContext ctx = new InitialContext();
    Datasource ds = (DataSource) ctx.lookup("jdbc/somedb");
}
``` where the service is identified by 'InitialContext ctx' and the resource reference is 'Datasource ds.' Note that the service itself in both examples is 'jdbc/somedb.'

Further, as illustrated, in retrofitting a plurality of resource references the system 400 next performs a bind operation (sub-block 514) by altering the plurality of resource references to retrofitted references (e.g., cloud based resource references) to point to a location agnostic service based on the programming model of the container. That is, the system 400 may utilize a Java Extended Edition resource reference to declare dependency on a cloud based resource reference (e.g., resource reference is then imported into the framework of the APP by sub-system 402 and the specific framework of the APP is retrofitted around the resource reference). For example, the service jdbc/somedb' is bound to the cloud based resource reference by the following:

```
Web.xml
...
<resource-ref>
    <res-ref-name>jdbc/somedb</res-ref-name>
    <res-type>javax.sql.DataSource</res-type>
    <res-auth>Container</res-auth>
    <res-sharing-scope>Unsharable</res-sharing-scope>
</resource-ref>
...
and further:
    Ibm-web-bnd.xml
...
    <resource-refname=jdbc/somedb bindingname=jdbc/mydb>
```

The process 500 continues in block 520 with autowiring, by the system 400, the web application to utilize the retrofitted references, which converts the web application into a cloud centric web application. For instance, the system 400 imports each cloud based resource reference and executes embedded runtimes to test and/or debug the web application. In addition, the autowiring by the system 400 may include a dynamic resolution process by the system. During the dynamic resolution, when a single container and/or database related the cloud based resource reference is automatically wired to the web application, all cloud based resource references from that container and/or database are automatically wired to the web application. For example, when a plurality of database services of a database server (e.g., Derby) are automatically wired via the Java Extended Edition programming model, the binding names of the Java Name and Directory Interface are dynamically matched to the database service names of the database.

The process 500 concludes in block 530 with deploying, by the system 400, the cloud centric web application to the cloud 430. The cloud centric web application may then provide the location agnostic services locally or in a cloud environment, i.e. wherever the cloud centric web application is exposed, without making any changes to the code of the web application.

The process 500 then ends.

Figure 6:
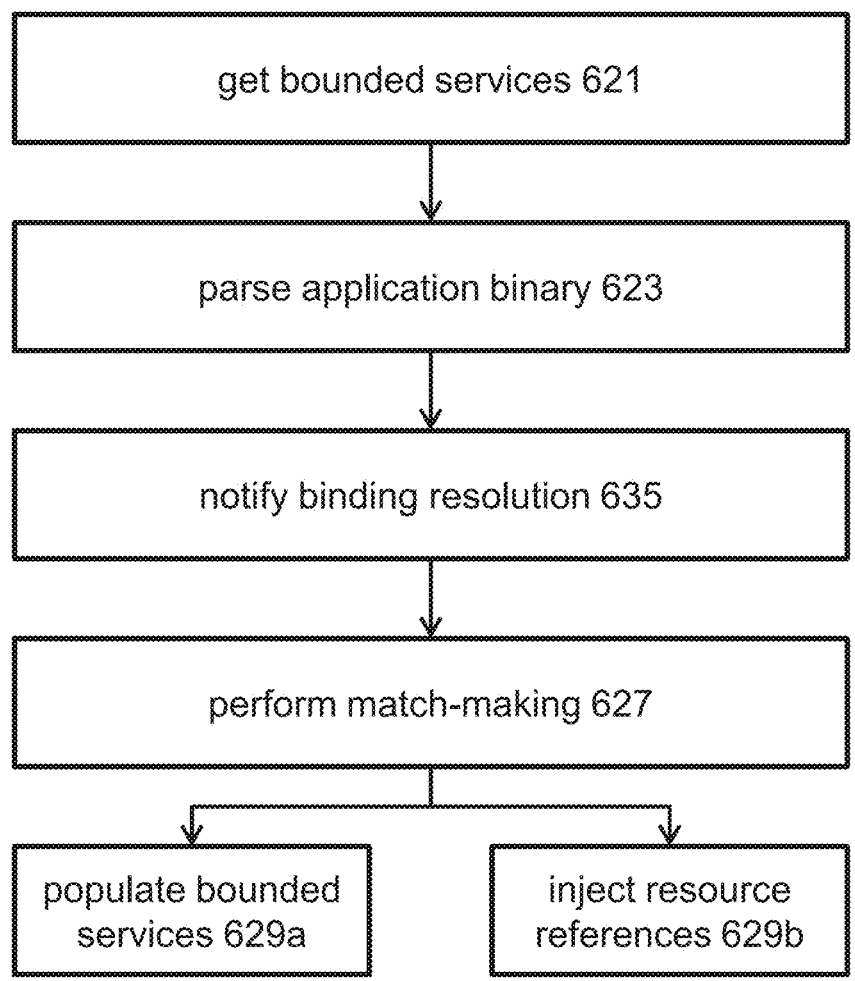
FIG. 6 illustrates an exemplary process flow of a dynamic resolution by an autowiring system.

The dynamic resolution by an autowiring system 400 will be described with reference to an exemplary process 620 of FIG. 6. Further, a web application and a Liberty Basic IDE are utilized to assist in illustrating the process 620; however, the process 620 is not intended to be limited to the web application and the Liberty Basic IDE. Furthermore, the process 620 may be included within the autowiring process, as described in block 520 of FIG. 5, or may be its own separate process that incorporates other aspects of the process 500 of FIG. 5.

The process 620 begins in block 621 with the Liberty Basic IDE getting bounded services from an environment. That is, the bounded services may be local or in the cloud 430, and the Liberty Basic IDE gets the details of those bound services (e.g., receives the retrofitted service bindings). Then, in block 623, the Liberty Basic IDE parses the application binary of the web application to lookup all the resource references within the web application. In this way, the Liberty Basic IDE discovers from the web application itself what pointers to what services already exist (e.g., by locating portion of the code like '@Resource') and determines what services the web application desires.

Next, in block 625, the Liberty Basic IDE notifies that a binding resolution is ready and imports the received bound services (from block 621) and imports the desired service (from block 623) to an autowiring code. The Liberty Basic IDE then, in block 627, performs a match-making operation that matches the pointers of the desired services to the actual bounded services. At this time, all resource references of each single container related to the actual bounded services may be automatically wired to the web application.

After the match-making, the process 620 continues to blocks 629a, 629b where the Liberty Basic IDE populates the bounded services and injects the resource references into the Java Name and Directory Interface so that corresponding structures are created in the Java Name and Directory Interface namespace.

The process 620 then ends.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product, the computer program product comprising a computer readable storage medium having program instructions embodied therewith, the program instructions executable by a processor to cause:

altering, by the processor, a plurality of resource references to produce a plurality of retrofitted references by:

performing a lookup of the plurality of resource references in accordance with a programming model of a container, wherein at least one of the plurality of resource references points to a service of an environment, the service utilizing a programming model that is incompatible with an application, and retrofitting the at least one of the plurality of resource references to point to a location agnostic service based on the programming model of the container to produce a retrofitted reference of the plurality of retrofitted references;

autowiring, by the processor, the retrofitted reference into the application to enable the application to utilize the service of the environment without alterations to a code of the application by:

parsing application binary of the application to determine a plurality of application resource references, and matching the retrofitted reference with a corresponding reference of the plurality of application resource references; and deploying, by the processor, the application to the environment in response to the autowiring of the retrofitted reference.

2. The computer program product of claim 1, wherein the application is a web application, the container is a web server, and the environment is a cloud environment.

3. The computer program product of claim 1, the autowiring of the plurality of retrofitted references into the application including:

executing embedded runtimes, each of the embedded runtimes performing at least one of a test and a debug of the plurality of retrofitted references within the application.

4. The computer program product of claim 1, the autowiring of the plurality of retrofitted references into the application including: dynamically resolving a set of services for a plurality of external containers, each external container relating to one of the plurality of retrofitted references.

5. The computer program product of claim 1, wherein the retrofitted reference is a location agnostic resource reference.

6. The computer program product of claim 1, wherein the retrofitted reference points to one of a plurality of location agnostic services.

7. The computer program product of claim 1, wherein the autowiring of the retrofitted reference enables the application to have location transparency.

8. A system, comprising a processor and a memory, the system configured to:

alter a plurality of resource references to produce a plurality of retrofitted references by:

performing a lookup of the plurality of resource references in accordance with a programming model of a container, wherein at least one of the plurality of resource references points to a service of an environment, the service utilizing a programming model that is incompatible with an application, and retrofitting the at least one of the plurality of resource references to point to a location agnostic service based on the programming model of the container to produce a retrofitted reference of the plurality of retrofitted references;

automatically wire the retrofitted reference into the application to enable the application to utilize the service of the environment without alterations to a code of the application by:

parsing application binary of the application to determine a plurality of application resource references, and matching the retrofitted reference with a corresponding reference of the plurality of application resource references; and deploy the application to the environment in response to the autowiring of the retrofitted reference.

9. The system of claim 8, wherein at least one of the plurality of resource references points to an external service, wherein the external service is configured to utilize a programming model that is incompatible with the application, and wherein the at least one of the plurality of retrofitted references corresponds to the at least one resource reference and the corresponding retrofitted reference is automatically wired into the application to enable the application to utilize the external service without alterations to a code of the application.

* * * * *